May 4, 1926.

W. G. KIRCHHOFF 1,583,052

DOUGH PROOFING MACHINE

Filed April 26, 1923

Inventor
WILLIAM G. KIRCHHOFF

By
Attorney

Inventor
WILLIAM G. KIRCHHOFF

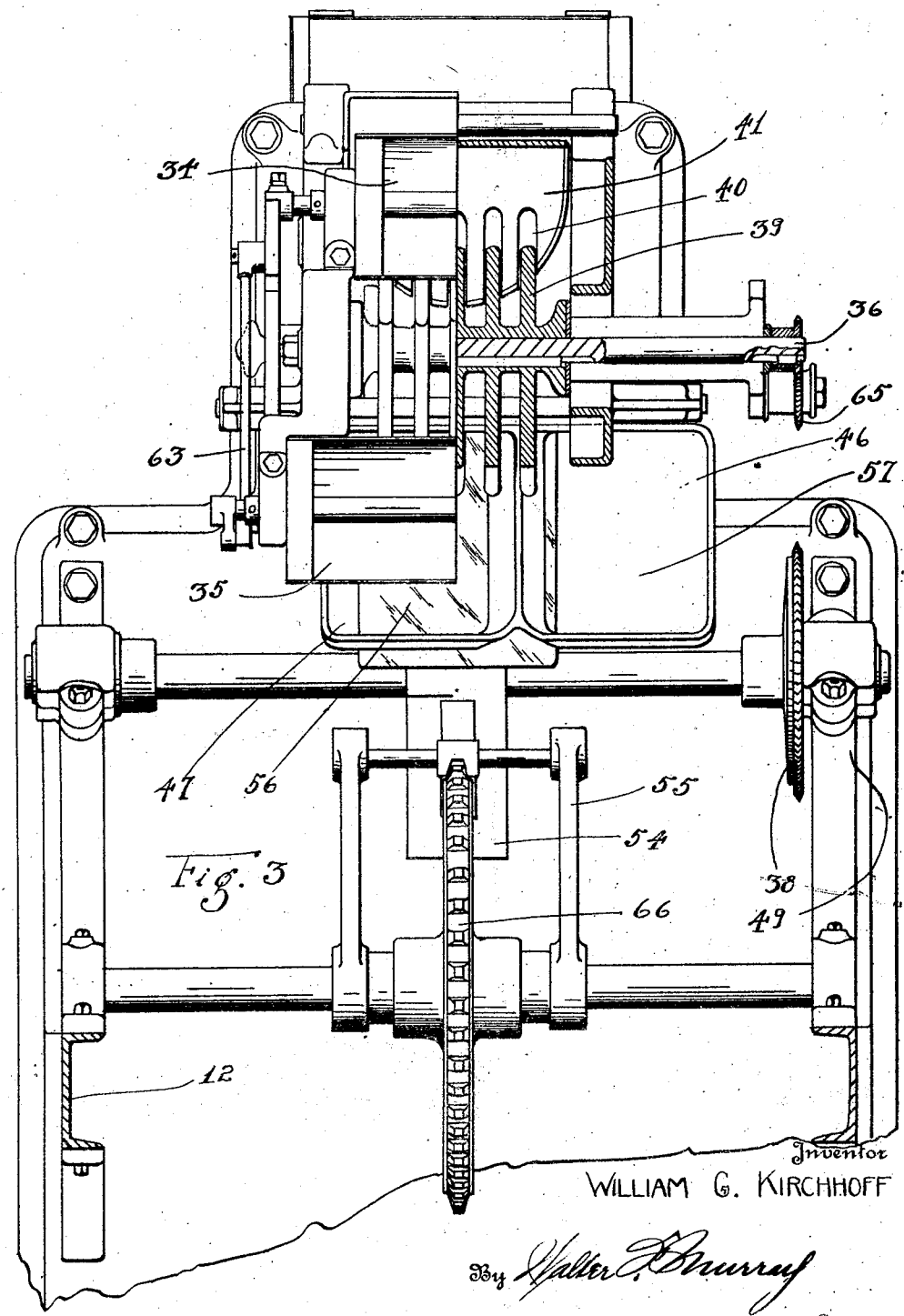

May 4, 1926.                                                          1,583,052
W. G. KIRCHHOFF
DOUGH PROOFING MACHINE
Filed April 26, 1923                    7 Sheets-Sheet 4
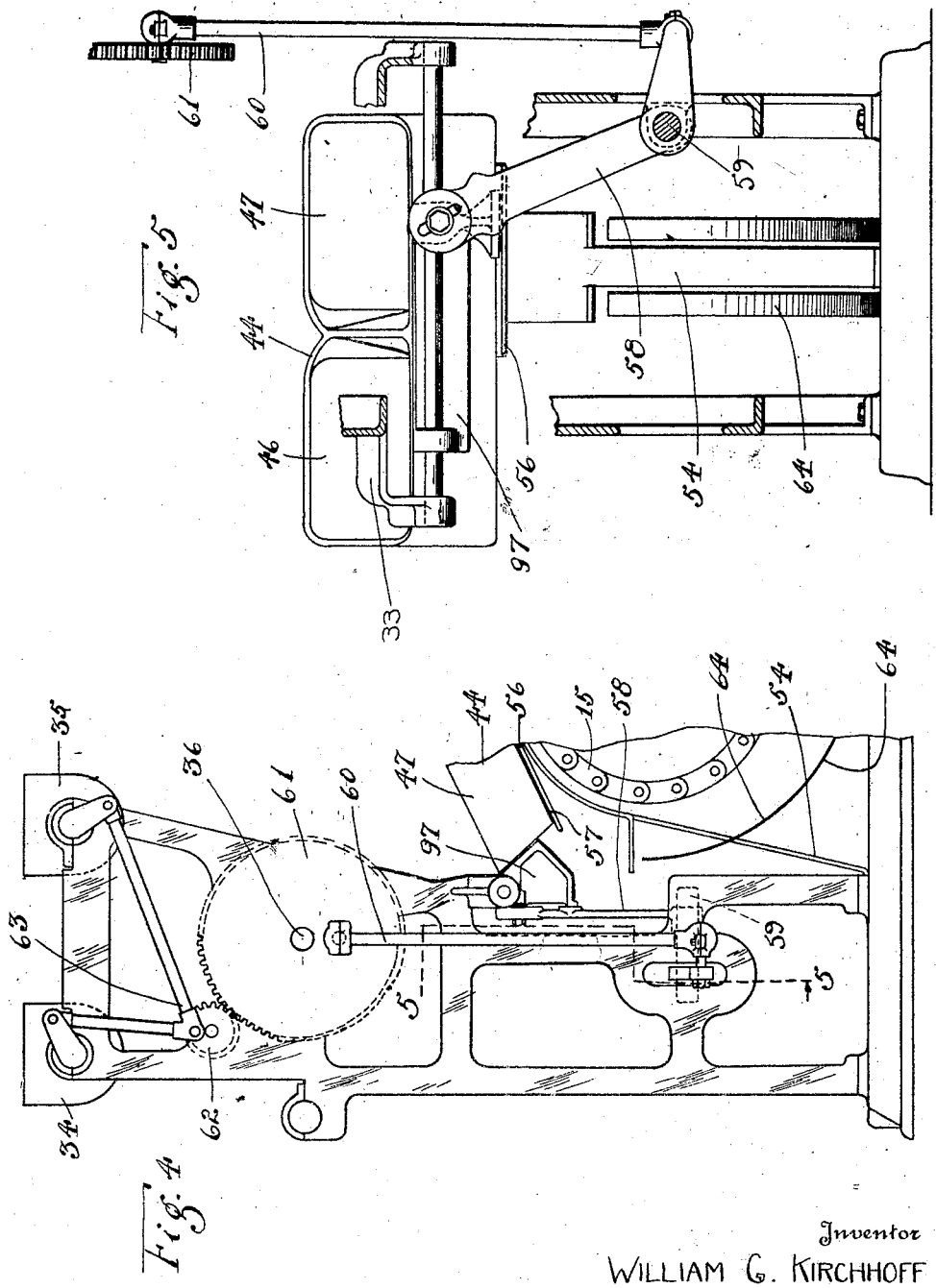
Inventor
WILLIAM G. KIRCHHOFF
By Walter F. Murray
Attorney

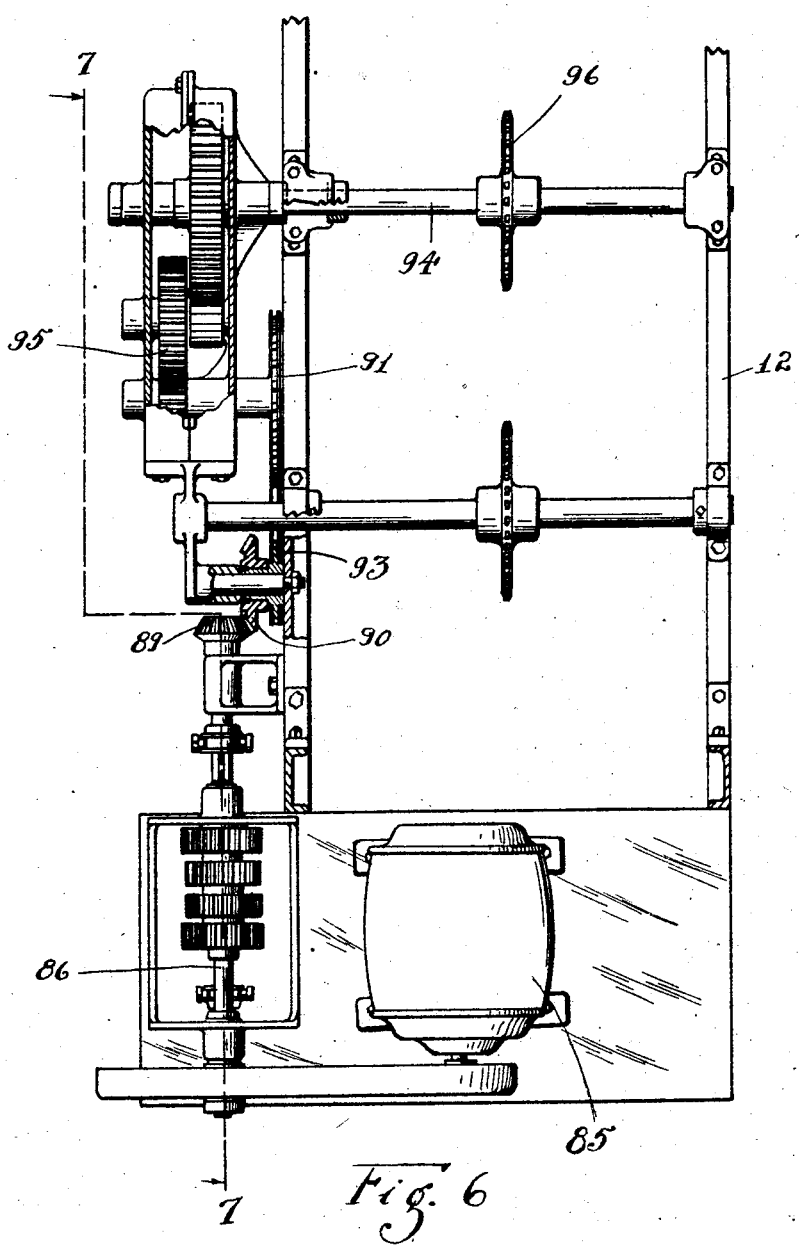

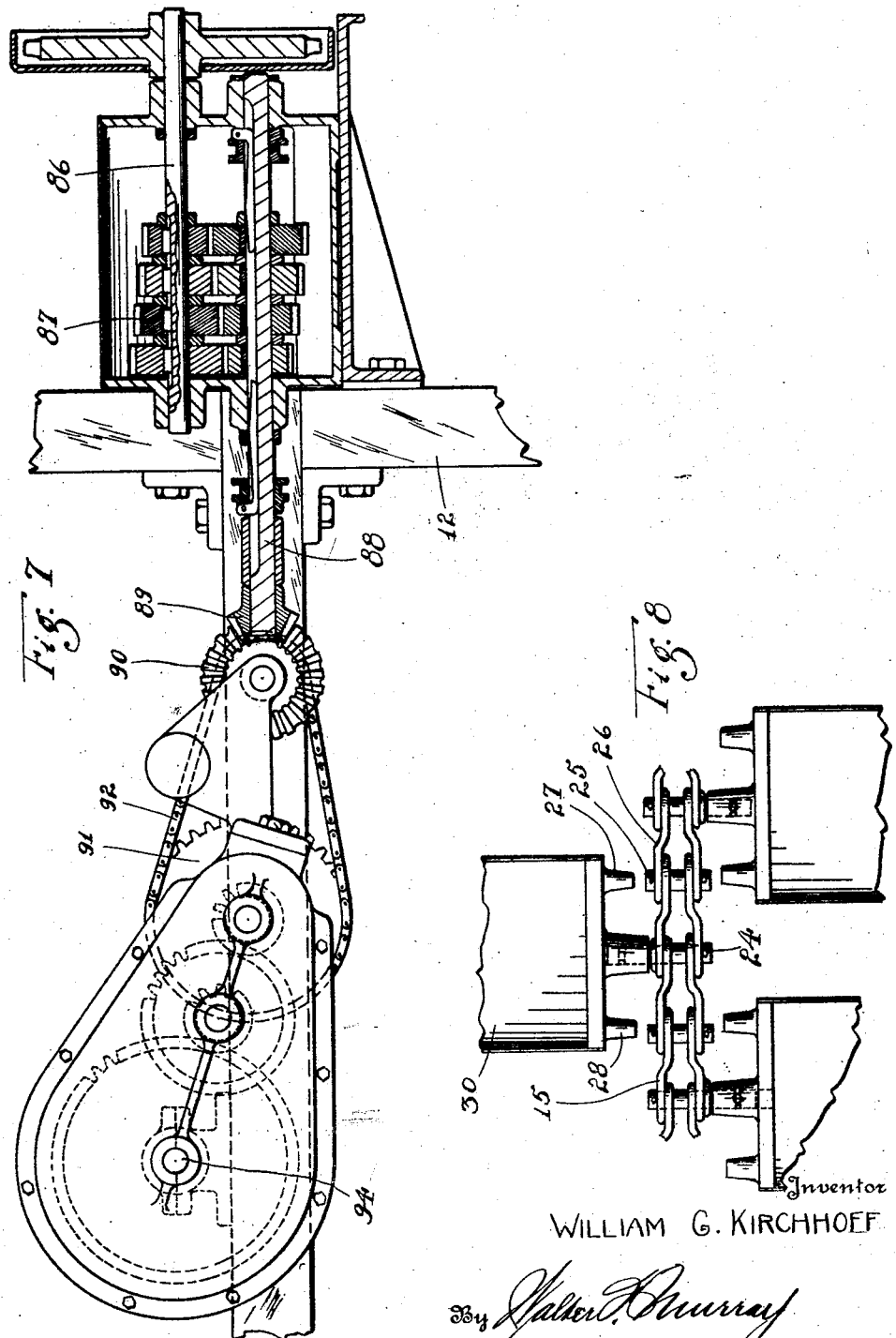

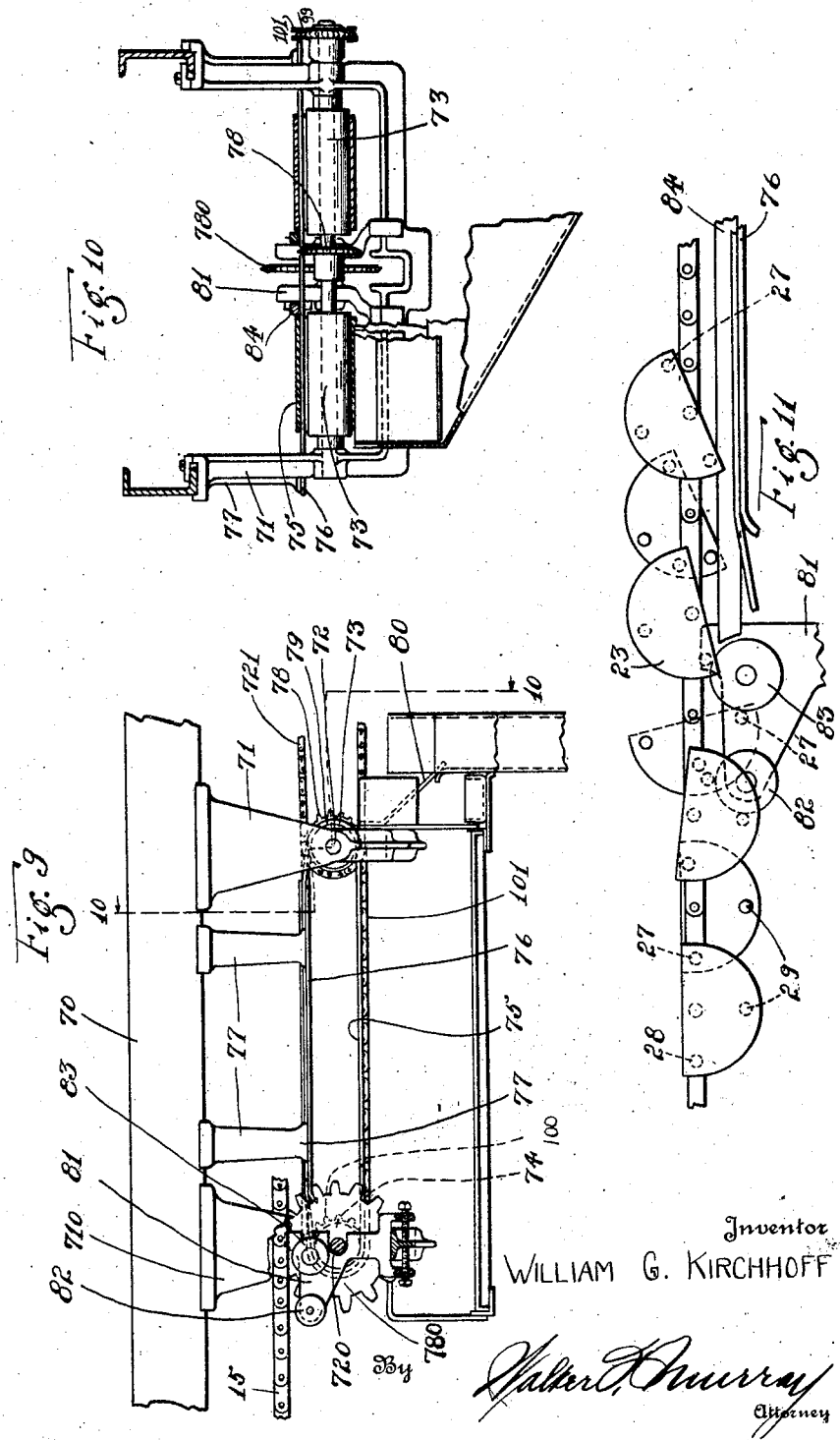

Patented May 4, 1926.

1,583,052

UNITED STATES PATENT OFFICE.

WILLIAM G. KIRCHHOFF, OF CINCINNATI, OHIO, ASSIGNOR TO THE J. H. DAY COMPANY, OF CINCINNATI, OHIO, A CORPORATION OF OHIO.

DOUGH-PROOFING MACHINE.

Application filed April 26, 1923. Serial No. 634,897.

*To all whom it may concern:*

Be it known that I, WILLIAM G. KIRCHHOFF, a citizen of the United States of America, and a resident of Cincinnati, in the county of Hamilton and State of Ohio, have invented a new and useful Improvement in a Dough-Proofing Machine, of which the following is a specification.

My invention relates to dough proofing machines wherein lumps of dough are distributed to trays and are carried by the trays through a proofing chamber whereupon the dough is discharged from the trays.

An object of my invention is to provide a simple and efficient device of the class described.

Another object of my invention is to provide means for expeditiously distributing individual lumps of dough in individual trays, preparatory to the proofing thereof.

Another object of my invention is to provide means for the discharge of the trays that will with certainty assure discharge of the trays and will maintain a constant discharge rate.

Another object of my invention is to provide certain improvements, set out in detail hereafter, over similar devices with which I am familiar.

These and other objects are attained by the means described herein and disclosed in the accompanying drawings, in which:

Fig. 3 is a plan view of the device shown in Fig. 2, parts being shown in section.

Fig. 4 is a side elevation of the device shown in Fig. 2 showing the opposite side of the device shown in Fig. 2.

Fig. 5 is an enlarged sectional view on line 5—5 of Fig. 4.

Fig. 6 is a plan view of a driving mechanism forming a detail of my invention.

Fig. 7 is an enlarged sectional view on line 7—7 of Fig. 6.

Fig. 8 is an enlarged detail view showing the mountings of the trays forming details of my invention.

Fig. 9 is a fragmental side elevation of a discharge device forming a detail of my invention.

Fig. 10 is a sectional view on line 10—10 of Fig. 9.

Fig. 11 is an enlarged detail view showing the tray inverting means, forming details of my invention.

Figure 1:
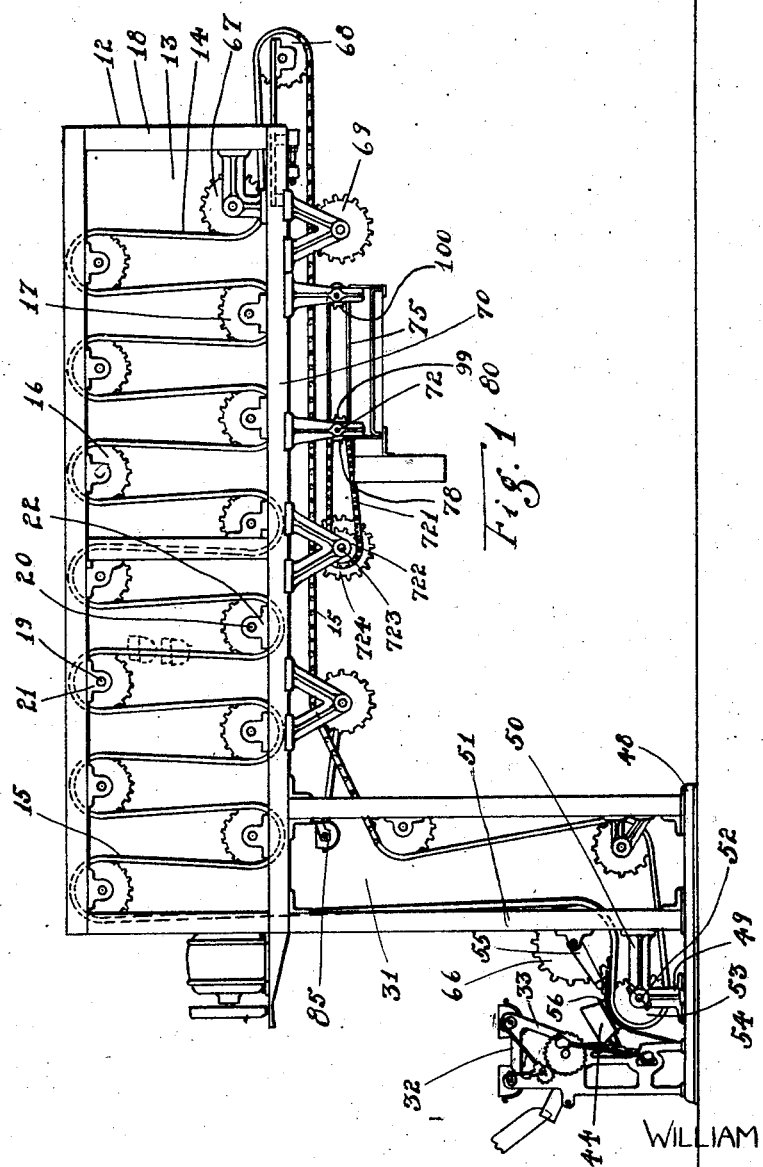
Fig. 1 is a side elevation of a proofing device embodying my invention.

The casing 12 may be suspended from a ceiling or may be supported above a floor in any suitable manner and has formed within it a chamber 13 through which a tray conveyor 14 may carry trays. The conveyor 14 comprises an endless chain 15 extending about sprockets 16 and 17 mounted at the top and bottom of the casing. The chain moves substantially vertically between adjacent sprockets 16 and 17 as it moves toward the rear 18 of the casing. The sprockets 16 and 17 are supported by suitable shafts 19 and 20 supported by brackets 21 and 22 carried by the upper and lower portions of the casing. The sprockets and the chain are disposed substantially midway of the sides of the casing and trays 23 extend from opposite sides of the chain in staggered relation. By reference to Fig. 8 it will be apparent that each tray is mounted on a stub shaft 24, and that adjacent stub shafts extend outwardly at considerable distance on opposite sides of the chain 15, and form bearings upon which the trays 23 are pivotally or rotatively mounted. The stub shafts 24 alternate with pins 25 for connecting the links 26 of the chain. The end of each tray adjacent the chain 15 carries lugs 27, 28 and 29. The lugs 27 and 28 are disposed adjacent the upper edge or mouth 30 of the tray at the outer edges thereof and the lugs 29 are disposed at approximately the center and lowermost portion of the tray and in substantial vertical alignment with the stub shaft 24 when the tray is in its normal position. The lugs 27 and 28 are in substantial horizontal alignment with one another and with the shaft 24 when the tray is in its normal position. The trays are suspended from the shafts 24 so that the center of gravity of the trays will serve to move and normally retain the trays in their upright or normal positions.

At the forward end of the casing, is provided a depending auxiliary casing having formed within it a chamber 31 communicating at its top with the chamber 13 and through which chamber the conveyor moves to and from the tray loading device 32. The tray loading device 32 comprises a frame 33 carrying at its top flouring devices 34 and 35 and supporting below such flouring devices a revoluble shaft 36 driven by means of a suitable chain 37 from the sprocket 38. The shaft 36 carries fingers 39 for moving through slots 40 formed in the lower portion of a holder 41 into which holder lumps of dough are discharged from any suitable source such as a baller.

Figure 2:
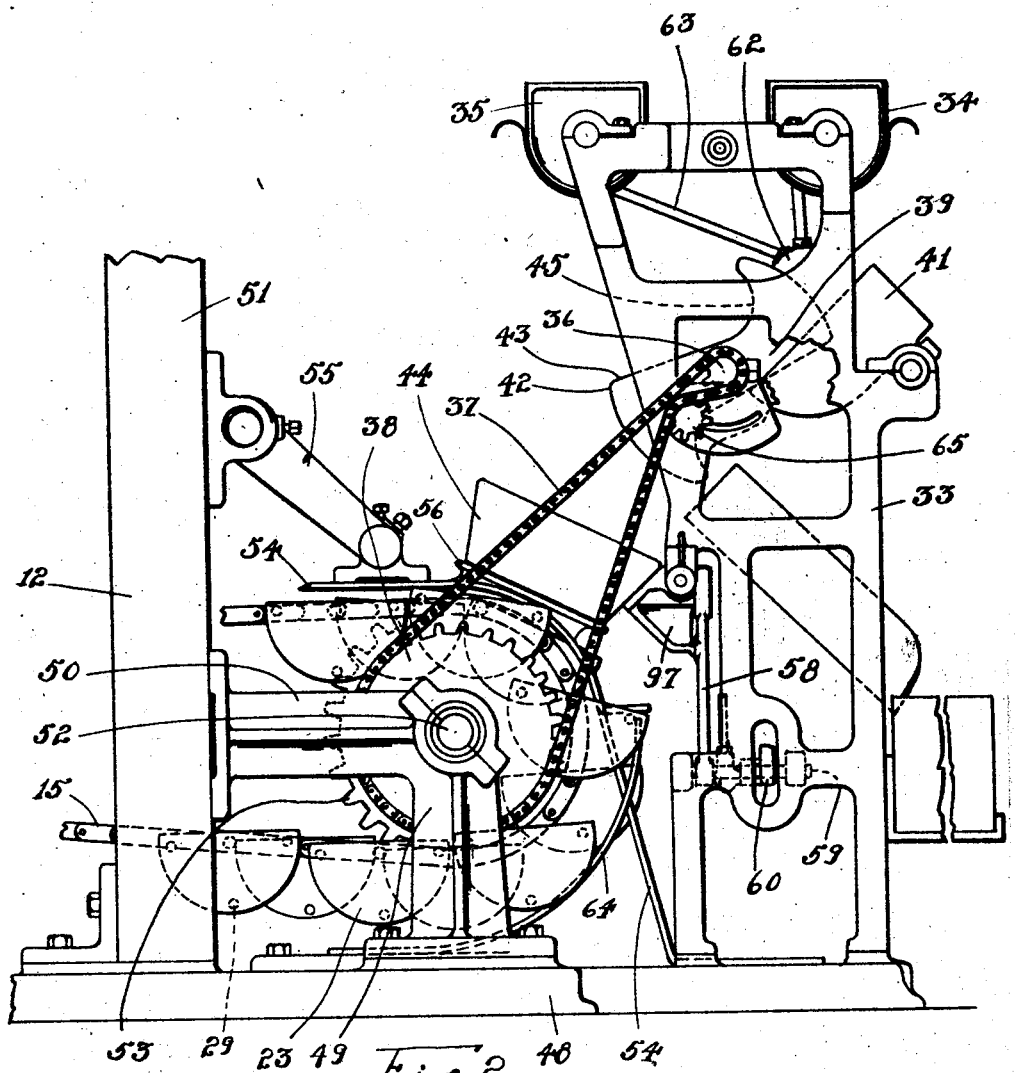
Fig. 2 is a side elevation of a tray loading mechanism forming a detail of my invention.

The fingers are curved at one end whereby a pocket like form is given to the opposite side of the fingers, each pocket being curved at its base as shown at 45 and extending outwardly to the end 42 of such fingers on a substantially straight line 43 whereby when the fingers are revolved in a counter clockwise direction, see Fig. 2, lumps of dough will be received by the fingers from the holder 41 and will slide over the face 43 of such fingers under the influence of gravity into a reciprocating cup 44 disposed to the rear and below the shaft 36. The flouring devices 34 and 35 are adapted to flour the holder 41, the fingers 39 and the reciprocating cup 44. The chain 15 carrying the trays extends forwardly from the chamber 31 and is adapted to pass the trays below the reciprocating cup 44. The reciprocating cup has two compartments formed in it, which receive lumps of dough in alternate sequence from the fingers 39. These compartments are shown at 46 and 47. The base 48 supporting the forward lower end of the casing 12 and supporting the frame 33 also supports a bracket 49 having an arm 50 secured to the forward wall 51 of the casing. The bracket 49 revolubly supports the shaft 52 carrying a sprocket 53 about which the chain 15 extends. A guard plate 54 extends about the sprocket 53 and is supported at its forward lower end by the base 48 and is supported at its rear and upper end by a bracket 55 carried by the forward wall 51 of the casing. The guard plate 54 carries a plate 56 of a size substantially coextensive with the lower end of the openings 57 extending through the cup 44 or rather the compartments therein. The chain 15 is disposed substantially central to the plate 56 and the plate is in substantial alignment with the fingers 39. The cup 44 is reciprocated transversely to the plate 56, and when either of the compartments of the cup is disposed above the plate 56, the plate 56 forms a closure for the bottom of the compartment. The lateral movement of the cup then causes the walls of the compartment containing the dough to carry the dough beyond the edge of the plate 56 whereupon the dough falls into one of the trays that at that time is disposed below the edge of the plate. The cup 44 is reciprocated by a mechanism carried by the frame 33. A bracket 97 carries the cup 44 and is mounted on the frame 33 for transverse reciprocation. Movement is imparted to the bracket from a bell crank lever 58 pivotally mounted at 59 upon the frame 33 and having its one arm pivotally mounted on one end of a connecting rod 60, the other end of which rod is eccentrically mounted upon the gear 61 mounted on the shaft 36. The flour dusting mechanisms 34 and 35 are driven from the gear 61 by any suitable means such as the gear 62 and suitable actuating means 63. A curved bar 64 in the nature of a spring bar has its lower edge secured upon the base 48. The bar 64 is adapted to be engaged by the lugs on the trays and to preclude swinging of the trays upon their pivotal mountings. Suitable means such as the idler gear 65 adjustable arcuately about the shaft 36 may be provided to tension the chain 37, through which motion is transmitted to the revolving fingers, see Fig. 2.

The trays carrying dough move upwardly about the sprocket 53 and into the chamber 31 about the sprocket 66, whereupon the trays are moved vertically through the proofing chamber 13. At the rear end of the proofing chamber 13, the trays move about a sprocket 67 from whence they move horizontally about a sprocket 68 carried by the casing 12, emerging from the chamber 13 and passing forwardly beneath the casing 12. Suitable support means such as the suspended sprockets 69 support the conveyor beneath the casing 12. As the trays move forwardly below the casing 12 they engage the discharge mechanism. The lower wall 70 of the casing carries depending brackets 71 and 710 supporting shafts 72 and 720 carrying rollers 73 and 74 about which extend endless belts 75. The upper portion of each belt 75 is supported by a plate 76 suspended from the casing by suitable means such as brackets 77. The shaft 72 has a sprocket 78 fixedly mounted thereon and driven by the chain 721 extending about sprocket 722 carried by the shaft 723 driven from sprocket 724 engaged by chain 15, see Fig. 1. Fixedly secured to the outer ends of the shafts 72 and 720 are sprockets 99 and 100 respectively about which chain 101 extends. The rollers are mounted on the shafts for movement with the shafts. The parts are so related that the belts will move at the same rate of speed as does the conveyor chain 15 move. The sprocket 780 is loosely mounted upon the shaft 720 and supports the chain 15. The forward or discharge ends 79 of the belts are disposed immediately above a chute 80 discharging downwardly into a moulder or other suitable receiving device, not shown. In view of the trays being in a staggered relation, the trays discharge their contents upon the belts 75 in such order that a lump of dough will be discharged alternately from the belts on opposite sides of the chain 15. The bracket 710 carries a roller plate 81 carrying rollers 82 and 83. A similar structure is provided on both sides of the chain 15. Each roller 82 is so disposed that the lower lug 29 on each of the trays on its respective side of the chain will engage therewith and will turn the tray so as to bring the forward and upper lug 27 into engagement with the roller 83, as shown in dotted lines in Fig. 11, thereby causing the tray to be inverted over the belt 75. The lug 27 of the inverted tray then passes to and engages upon a bar 84 mounted upon the plate 76 and extending in parallelism with the chain 15, thereby retaining the tray in an inverted position as the tray moves forwardly in unison with the belt. During this joint forward movement of the belt and the tray, the dough is able to completely disassociate itself from the tray and is discharged from the belt into the chute 80. As the tray moves beyond the forward end of the bar 84 the tray again resumes its normal position. The chain 15 carries the trays from the discharge device forwardly beneath a suitable flouring or dusting mechanism 85 from whence the trays pass to the loading mechanism.

The tension of the chain 15 may be modified by adjusting the sprocket 68 longitudinally of the casing 12 as shown in Fig. 1. Any suitable means for this purpose may be employed. By reference to Fig. 6, it is apparent that all of the mechanisms are operated from the same source of power. The motor 85 drives shaft 86 operative through a suitable clutch mechanism 87, for example as shown in my United States Letters Patent #1,189,136, upon a shaft 88 carrying a bevel gear 89 in mesh with a bevel gear 90. The bevel gear 90 drives a sprocket 91 through the chain 92 and sprocket 93. The sprocket 91 drives the transversely extending shaft 94 through a suitable gear reduction 95. The shaft 94 carries a suitable sprocket 96 engaged by the chain 15. Motion is imparted to the loading and unloading mechanisms from the chain 15 as previously described. Suitable flouring mechanisms for the belts may be operated from the shaft 720 by suitable gearing mechanism, for example as shown for operating the flour dusters 34 and 35.

In the operation of my device, dough is received in the holder 41 from a baller or the like, and is transmitted from the holder 41, by means of the transfer fingers 39 to one of the compartments in the cup 44. The cup is moved laterally and the dough therein is discharged into a tray disposed on one side of the chain 15. When the one compartment in the cup 44 is moved to a discharge position the other compartment is moved to a receiving position and such other compartment receives the next lump of dough, and when the cup is moved in an opposite direction the second lump of dough, is discharged into a tray on the opposite side of the chain 15. After the dough has passed through the proofing chamber the tray is discharged upon the belts 75 as previously explained, from whence the dough passes to the chute 80.

What I claim is:

1. In a device of the class described, the combination with an endless chain and invertible trays carried by the chain, of means for depositing lumps of dough and the like in the trays, and a discharge device comprising means for inverting the trays, and a belt for receiving dough from the inverted trays, the belt, when receiving dough, moving in the same direction and at the same rate of speed as do the inverted trays.

2. In a device of the class described the combination of an endless chain, invertible trays carried by the chain and extending from opposite sides thereof in staggered relation, means for depositing lumps of dough and the like in the trays, and a discharge device comprising means for inverting the trays, belts disposed on opposite sides of the chain for receiving dough from the inverted trays, means for moving the belts in the same direction and at the same rate of speed with the inverted trays when receiving dough therefrom, and means for receiving the dough from the belts, the parts bearing a relation such that dough is discharged from the belts to the receiving means in alternate sequence.

3. In a device of the class described the combination with a chain and invertible trays carried by the chain, of means for inverting the trays, and a receiving means below the inverted trays, said means moving in the same direction with the trays and moving at the same rate of speed as do the trays move, while receiving from the inverted trays.

4. In a device of the class described the combination with a chain and invertible trays carried by the chain on opposite sides thereof in staggered relation, of means for inverting the trays, means below the inverted trays for movement at the same rate of speed, in the same direction and in substantial parallelism with the line of movement of the inverted trays for receiving articles from the trays, and means for receiving articles from the second mentioned means.

5. In a device of the class described the the combination with an endless chain, and trays carried by the chain and mounted for inversion, the one end of each tray having a lug at its forward upper end and a second lug at its lower central portion, of an inverting device comprising a pair of spaced rollers in substantial horizontal alignment, the one roller being mounted for engagement upon the lower central lug for tilting of the tray whereby the upper forward lug is moved downwardly, the second roller being positioned for engagement by the upper and forward lug for continuing the tilting of the trays to an inverted position, both rollers being free to move with the lugs as the tray is moved beyond the rollers, and a bar for receiving from the second roller the lug in engagement therewith for retaining the tray in an inverted position.

6. In a device of the class described the combination with an endless chain, and trays carried by the chain and mounted for inversion, the one end of each tray having a lug at its forward upper end and a second lug at its lower central portion, of an inverting device comprising a pair of spaced rollers in substantial horizontal alignment, the one roller being mounted for engagement upon the lower central lug for tilting of the tray whereby the upper forward lug is moved downwardly, the second roller being positioned for engagement by the upper and forward lug for continuing the tilting of the trays to an inverted position, both rollers being free to move with the lugs as the tray is moved beyond the rollers, and a bar for receiving from the second roller the lug in engagement therewith for retaining the tray in an inverted position, and an endless belt adjacent the bar and moving with the trays for receiving articles from the trays when retained in their inverted position by the bar.

In testimony whereof, I have hereunto subscribed my name this 11th day of April, 1923.

WILLIAM G. KIRCHHOFF.